US012388538B2

(12) United States Patent
Parker et al.

(10) Patent No.: US 12,388,538 B2
(45) Date of Patent: Aug. 12, 2025

(54) UTILIZATION OF MICROPHONE ULTRASONIC RESPONSE

(71) Applicant: INVENSENSE, INC., San Jose, CA (US)

(72) Inventors: Jeremy Parker, Chelmsford, MA (US); Stephen Bart, West Newton, MA (US)

(73) Assignee: INVENSENSE, INC., San Jose, CA (US)

( * ) Notice: Subject to any disclaimer, the term of this patent is extended or adjusted under 35 U.S.C. 154(b) by 86 days.

(21) Appl. No.: 18/360,463

(22) Filed: Jul. 27, 2023

(65) Prior Publication Data
US 2024/0048249 A1 Feb. 8, 2024

Related U.S. Application Data

(60) Provisional application No. 63/369,687, filed on Jul. 28, 2022.

(51) Int. Cl.
*H04B 11/00* (2006.01)
(52) U.S. Cl.
CPC .................................. *H04B 11/00* (2013.01)
(58) Field of Classification Search
CPC .... H04R 19/04; H04R 1/1041; H04R 19/005; H04R 2201/003; H04R 2400/01; H04R 29/004; H04R 2499/11; H04B 11/00; H04S 7/301; H04S 7/302; H04S 2400/13; G01S 15/08; G01S 15/04; G01S 7/523; G01S 7/521; B06B 1/02; H04M 1/6008
See application file for complete search history.

(56) References Cited

U.S. PATENT DOCUMENTS

| 3,979,712 | A | * | 9/1976 | Ettenhofer | G01S 3/8083 367/901 |
| 4,338,846 | A | * | 7/1982 | Pogoda | G10H 1/44 84/723 |
| 6,859,538 | B1 | * | 2/2005 | Voltz | G06F 3/162 381/101 |
| 7,283,635 | B1 | * | 10/2007 | Anderson | H04R 1/10 381/384 |
| 9,693,169 | B1 | | 6/2017 | Carlsson et al. | |
| 10,601,385 | B2 | | 3/2020 | Moberg et al. | |

(Continued)

OTHER PUBLICATIONS

Qin et al. "ProxiMic: Convenient Voice Activation via Close-to-Mic Speech Detected by a Single Microphone" CHI '21: Proceedings of the 2021 CHI Conference on Human Factors in Computing Systems, May 2021, Article No. 8, pp. 1-12, https://dl.acm.org/doi/10.1145/3411764.3445687, 12 pages.

(Continued)

*Primary Examiner* — Daniel L Murphy
*Assistant Examiner* — Amie M Ndure
(74) *Attorney, Agent, or Firm* — Amin, Turocy & Watson, LLP

(57) ABSTRACT

Utilization of microphone ultrasonic response is described. A system, comprising: a microelectromechanical system (MEMS) microphone device configured to capture signal data representing an ultrasonic signal and an audio-band signal simultaneously, and a processing circuitry configured to adjust a configuration parameter associated with the MEMS microphone device based on the ultrasonic signal.

20 Claims, 7 Drawing Sheets

(56) References Cited

U.S. PATENT DOCUMENTS

| | | | |
|---|---|---|---|
| 2001/0008499 A1* | 7/2001 | Ko | G08C 23/02 367/2 |
| 2004/0096072 A1* | 5/2004 | Orten | G01S 15/88 381/113 |
| 2004/0133535 A1* | 7/2004 | Scharler | G01S 5/06 340/686.1 |
| 2008/0075306 A1* | 3/2008 | Poulsen | H04R 29/004 381/59 |
| 2009/0180643 A1* | 7/2009 | Sander | H04M 1/05 381/122 |
| 2011/0003614 A1 | 1/2011 | Langereis et al. | |
| 2016/0090293 A1* | 3/2016 | Oliaei | H04R 1/08 381/111 |
| 2016/0097855 A1 | 4/2016 | Qutub et al. | |
| 2017/0180870 A1* | 6/2017 | Hung | A61B 7/00 |
| 2017/0214994 A1 | 7/2017 | Gadonniex et al. | |
| 2017/0235434 A1* | 8/2017 | Qutub | G06F 3/0436 345/177 |
| 2019/0028803 A1* | 1/2019 | Benattar | H04S 7/304 |
| 2019/0301956 A1 | 10/2019 | Tanaka et al. | |
| 2019/0369236 A1 | 12/2019 | Rusconi et al. | |
| 2020/0145956 A1* | 5/2020 | Goldstein | G16H 50/80 |
| 2021/0014600 A1 | 1/2021 | Neumaier et al. | |
| 2021/0017016 A1 | 1/2021 | Anzinger et al. | |
| 2021/0075860 A1* | 3/2021 | Binder | G07C 3/02 |
| 2021/0127202 A1 | 4/2021 | Ayazi et al. | |
| 2022/0224300 A1 | 7/2022 | Knode | |
| 2022/0264238 A1* | 8/2022 | Svajda | H04R 29/004 |
| 2022/0399145 A1* | 12/2022 | Kirichenko | G06N 10/40 |
| 2024/0428970 A1* | 12/2024 | Kirichenko | H01F 6/006 |

OTHER PUBLICATIONS

Infineon "XENSIV™ MEMS microphone with 67 dB(A) SNR and ultrasonic receiving/sending capabilities" Infineon Technologies AG, Munich German, Nov. 2021, 5 pages.

International Search Report and Written Opinion received for PCT Application Serial No. PCT/US2023/028946 dated Nov. 27, 2023, 15 pages.

Notice of Allowance received for U.S. Appl. No. 18/063,374 dated Sep. 12, 2024, 26 pages.

International Preliminary Report on Patentability received for PCT Application Serial No. PCT/US2023/028946 dated Feb. 6, 2025, 9 pages.

* cited by examiner

UTILIZATION OF MICROPHONE ULTRASONIC RESPONSE

CROSS REFERENCE TO RELATED APPLICATIONS

This application claims priority to U.S. Provisional Patent Application Ser. No. 63/369,687, titled: "UTILIZATION OF MICROPHONE ULTRASONIC RESPONSE," filed Jul. 28, 2022, the disclosure of which is hereby incorporated herein by reference in its entirety.

TECHNICAL FIELD

The subject disclosure relates to utilization of microphone ultrasonic response.

BACKGROUND

Microphones that are designed for high-performance applications (e.g., studio/stage) within audible frequency ranges (e.g., 20 Hertz (Hz)-20 kilo Hertz (kHz)) can have limited response in ultrasonic frequencies, and therefore are generally limited in functionality beyond and/or below the audio capture range of about 20 Hz to about 20 kHz. Traditional electrostatic capacitor-based microphone (ECM) and/or condenser microphone designs typically must sacrifice signal-to-noise ratio (SNR) to achieve very high bandwidth into the ultrasonic range (e.g., beyond approximately 20 kHz).

SUMMARY

The following presents a simplified summary of the invention to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In accordance with various embodiments set forth herein, the subject disclosure provides a system, comprising: a microelectromechanical system (MEMS) microphone device configured to capture signal data representing an ultrasonic signal and an audio-band signal simultaneously, and a processing circuitry configured to adjust a configuration parameter associated with the MEMS microphone device based on the ultrasonic signal.

Concerning the foregoing, the ultrasonic signal can be a first ultrasonic signal, and wherein the MEMS microphone device can receive the first ultrasonic signal in response to sending the second ultrasonic signal. Further, when the MEMS microphone device is a first MEMS microphone device, the ultrasonic signal is a first ultrasonic signal, a second MEMS microphone device can be configured to send the first ultrasonic signal and the first MEMS microphone device can be configured to receive the first ultrasonic signal.

Additionally, the configuration parameter can be stored in a memory associated with the processing circuitry, wherein the configuration parameter can be determined dynamically, and the ultrasonic signal can comprise the configuration parameter. Also, the processing circuitry can be configured to transmit instruction data in an ultrasonic frequency.

Moreover, when the MEMS microphone device is a first MEMS microphone device, the ultrasonic signal can be broadcast by a second MEMS microphone device, and when the MEMS microphone device is a first MEMS microphone device, the ultrasonic signal can be received from a second MEMS microphone device.

Further, when the ultrasonic signal is a first ultrasonic signal, the MEMS microphone device, in response to the first ultrasonic signal, can broadcast a second ultrasonic signal, when the MEMS microphone device is a first MEMS microphone device, the ultrasonic signal can be broadcast by a MEMS transducer device as an ultrasonic ping, wherein the MEMS transducer device can comprise a grouping representative of capacitative micro-machined ultrasonic transducer (CMUT) equipment, piezoelectric micro-machined ultrasonic transducer (PMUT) equipment, and/or or the first MEMS microphone device.

In some instances, when the MEMS microphone device can be configured to operate as loudspeaker equipment by radiating the signal data at a frequency greater than a resonant frequency of the MEMS microphone device. In some further instances, the ultrasonic signal can comprise a signal for the MEMS microphone device to determine a distance to an object proximately located to the MEMS microphone device.

Moreover, when the MEMS microphone device is a first MEMS microphone device, ultrasonic signal can be representative of a signal for the first MEMS microphone device to determine a distance from the first MEMS microphone device to a second MEMS microphone device. Additionally, when the MEMS microphone device is a first MEMS microphone device, the ultrasonic signal can be representative of a directive for the first MEMS microphone device to listen for an ultrasonic ping radiated by a second MEMS microphone device.

Furthermore, the described systems can comprise cancellation circuitry that can be used to cancel or ameliorate the effects of large audio-band and/or ultrasonic signal variations. Also, detailed systems can listen and monitor for other ultrasonic signals and in response can change the ultrasonic signal operation of the MEMS microphone device to avoid conflict with other ultrasonic signals.

In accordance with various embodiments set forth herein, the subject disclosure also provides systems and/or methods that can perform a series of acts. The acts can comprise receiving, by a processing circuit, signal data comprising audio-band signal data and ultrasonic signal data, wherein the audio-band data and the ultrasonic signal data are received simultaneously, and based on the ultrasonic signal data, adapting, by the processing circuit, a configuration parameter associated with a microelectromechanical system (MEMS) transducer.

Concerning the foregoing, the MEMS transducer can be representative of a microphone, and further acts can comprise in response to detecting, by the processing circuit, an object within a defined distance to the microphone, switching the microphone from a first state to a second state, wherein the first state represents an active state and the second state represents a inactive state.

Additional acts can comprise based on the ultrasonic signal data, changing a gain value associated with the MEMS transducer from a first gain value to a second gain value. Moreover, when the MEMS transducer represents a microphone, further acts can comprise, based on the ultrasonic signal data and a determination that a distance between user identities located proximate to the microphone has exceeded a threshold distance, adjusting, by the processing circuit, an equalization value of the microphone to compensate for a change in the distance.

Further acts can also comprise listening, by the processing circuit, for a group of ultrasonic aggressor signals emitted by ultrasonic aggressor equipment, and based on the group of ultrasonic aggressor signals, determining a collection of ultrasonic frequencies associated with the group of ultrasonic aggressor signals and identifying the collection of ultrasonic frequencies as being occupied. The ultrasonic signal data can comprise a sequence of repeating ultrasonic ping tones.

The following description and the annexed drawings set forth certain illustrative example implementations and embodiments of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

The numerous aspects, embodiments, objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
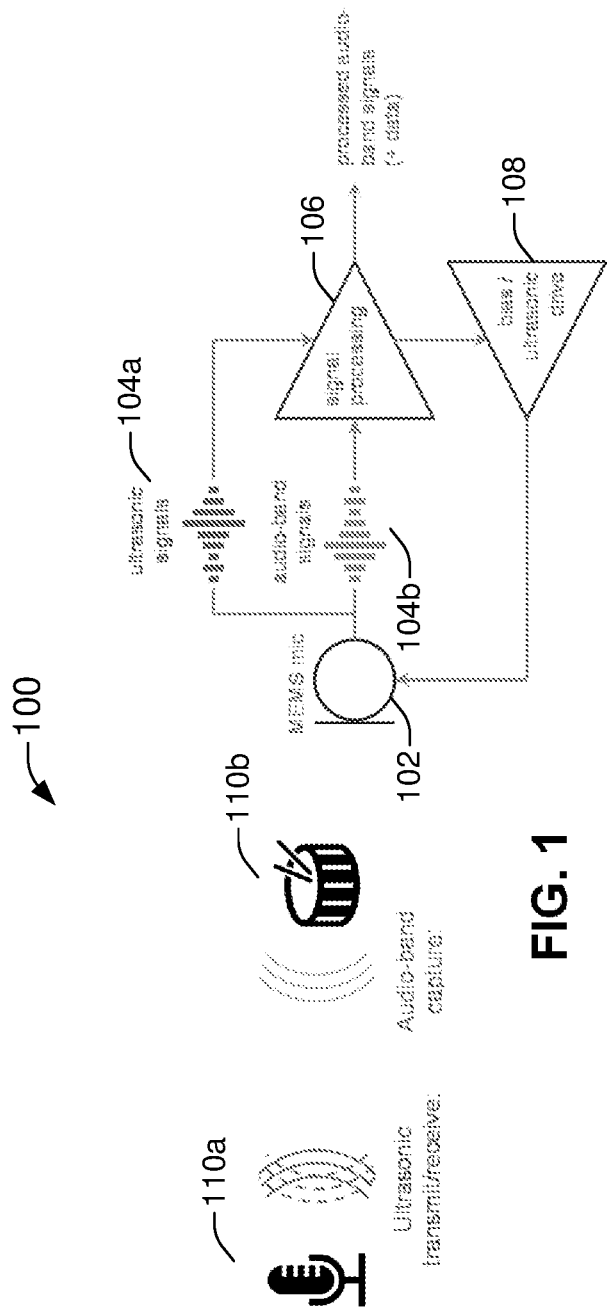
FIG. 1 provides a high-level depiction of a system for using MEMS transducer ultrasonic response in accordance with various example implementations and/or embodiments set forth in this disclosure.

One or more embodiments and/or implementations are now described with reference to the drawings, wherein like reference numerals are used to refer to like elements throughout. In the following description, for purposes of explanation, numerous specific details are set forth in order to provide a thorough understanding of the various example implementations and/or embodiments. It may be evident, however, that the various example embodiments and/or implementations can be practiced without these specific details. In other instances, well-known structures and devices are shown in block diagram form in order to facilitate describing the embodiments and/or implementations in additional detail.

Microphones can generally be considered as being transducers that convert sound energy signal data to electrical signal data. Microphones can be used in many applications such as telephones, hearing aids, public address systems for concert halls and public events, motion picture production, live and recorded audio engineering, sound recording, two-way radios, megaphones, and radio and television broadcasting. They can also be used in computers for recording voice, speech recognition, voice over internet protocol (VoIP) applications, and for other purposes such as ultrasonic sensors or knock sensors in automotive vehicles.

Several types of microphone are currently in use today, each converting the air pressure variations of a sound wave to an electrical signal data. Some microphones use a coil of wire suspended in a magnetic field to facilitate the conversion of air pressure variations to electrical signal data (e.g., the dynamic microphone). Other microphones use a diaphragm that can vibrate as a capacitor plate to convert air pressure variations to electrical signal data (e.g., condenser microphone). Yet other microphones use piezoelectric materials to effect the conversion of pressure wave variations to electrical signal data (e.g., the contact microphone).

Microphones that are designed for high-performance applications (e.g., studio/stage) within audible frequency ranges (e.g., 20 Hz-20 kHz) can have limited response in ultrasonic frequencies, and therefore are generally limited in functionality beyond and/or below the audio capture range between approximately 20 Hz and about 20 kHz. Traditional electret condenser microphone (ECM) and/or condenser microphone designs typically and generally sacrifice SNR to achieve very high bandwidth into the ultrasonic range (e.g., beyond approximately 20 kHz).

Microelectromechanical system (MEMS) microphones (and/or other transducer type equipment) and MEMS microphone arrays (and/or other arrays of transducer class equipment) can be scaled in size and/or number to achieve high SNR and can also have frequency response extending well into the ultrasonic range (e.g., approaching and greater than about 20 kHz). Such MEMS equipment can allow capture of air pressure variations well into the ultrasonic range, which can enable a multitude of functionality beyond high-resolution recording (e.g., 192 kHz sample-rate). Additional and/or alternative functionalities, in various implementations and/or embodiments, can include proximity detection, range-finding, and data transmission of data, commands, and/or instructions, all of which can be used to optimize the audio-band capture (e.g., depending on the actions, facilities, and/or functionalities being optimized: minimizing parameters in some instances, and/or maximizing parameters in other instances). Such functionalities and/or facilities can be achieved, for example, by integration with specifically designed ultrasonic transmitting equipment and/or by using the disclosed MEMS equipment itself to perform transmissions into the ultrasonic range.

The disclosed and described embodiments and/or implementations set forth herein provide MEMS equipment, such as a MEMS transducer equipment (e.g., equipment that converts energy from one form to another) that capture both studio-quality audio sound and ultrasonic information/data from the ambient acoustic environment. The captured ultrasonic information/data can be used both in real-time and/or after-the-fact to optimize the audio sound capture itself. For example, a microphone (e.g., a transducer) employing the described subject matter can actively measure/determine a changing distance from an individual's mouth (and/or other specified reference parts of the individual), while contemporaneously capturing the audio sound emitted by the individual (e.g., user identity), and automatically adjust for gain variations (e.g., voltage fluctuations) to compensate for the changing distances of the individual's mouth and the vocal (e.g., audio spectrum) microphone. Further, such a microphone could also automatically mute itself in response to determining that no user identity is within a defined vicinity of the microphone, and can automatically un-mute itself in response to determining that a user identity is present within the defined vicinity of the microphone. There are many other examples of how useful information/data can be embedded/encoded, sent and/or received by ultrasonic means while audio-band capture and processing is being performed, informed, improved, or otherwise modified in a proactive, rather than a reactive, manner through application and use of the embedded/encoded ultrasonically conveyed information/data.

Currently, range-finding, data transmission, and other ultrasonic functionality is generally being performed with purpose-built equipment, like piezoelectric micro-machined ultrasonic transducers (PMUTs) and/or capacitive micro-machine ultrasonic transducers (CMUTs). These purpose-built PMUTs and/or CMUTs have generally been optimized for a narrowband within the ultrasonic range and typically cannot simultaneously operate as high-performance microphones within audible frequencies as well as being emitters (and/or transceivers—capable of both simultaneously, and/or in near contemporaneity, receiving and transmitting) of ultrasonic frequencies.

A MEMS transducer, such as a microphone and/or a microphone array of microphones of suitably high bandwidth (e.g., in the approximate range of 20 Hz to 100 kHz), as described herein in various disclosed example embodiments and implementations, can be used to capture both audio-band and ultrasonic acoustic sources. Due to the fact that the disclosed MEMS transducers (e.g., microphones) can typically have resonant frequencies in the range of about 20 kHz to about 40 kHz, which can be well below the highest ultrasonic frequencies of interest (e.g., around 80 KHz to around 100 kHz), the described MEMS transducers can also operate as loudspeakers by radiating sound at or above its resonant frequencies.

An general purpose integrated circuit (IC) and/or an application-specific integrated circuit (ASIC)—an integrated circuit chip configured for a particular use, or downstream processing (e.g., in addition to and/or as an alternative to the general purpose IC and/or ASIC) can initiate ultrasonic transmission and/or reception based on user identity input, audio-bandwidth processing, or other automatic means. The data that can be gathered and utilized by such activity can comprise: data that can be used to determine range/amplitude to a nearest object. Further data can also comprise a broadcasted ping (and/or sequence of pings) that the described MEMS transducer can listen for, wherein the broadcasted ping and/or ping sequences can have been (and/or are being) emitted from one or more external broadcast source (e.g., a transducer similarly configured to that detailed in the subject disclosure, and an external independent ultrasonic transceiver that emits ultrasonic signals). Additional data can also comprise unwanted or undesired ultrasonic and/or subsonic aggressors, such as standalone proximity detection equipment, wherein the data can be used to determine "occupied" frequencies in both the ultrasonic frequency ranges as well as in the subsonic (e.g., below approximately 20 Hz) frequency ranges. Furthermore, the data gathered or collected can also include data that can be used to analyze audio-band information that can be used to determine frequency content versus a defined time horizon, such as real-time Fast Fourier Transformation (FFT) analysis. In addition, the gathered or collected data can comprise useful information, such as machine-executable commands and/or processor-executable instructions that upon execution of the commands and/or instructions, by the MEMS equipment, can cause the MEMS equipment and/or any equipment in the vicinity of the MEMS equipment to individually, as a collective grouping, and/or a selectively determined group, of equipment to perform one or more operations.

Example actions and/or functionalities that can be facilitated, based at least in part on the gathered or collected data, can comprise turning up or down the gain or adjust equalization (EQ) of a MEMS microphone in real time and/or automatically compensate for a changing distances (or distance variations) to a source of the audio-signal (e.g., a singer); muting the MEMS microphone in response to determining that no person and/or object is within a determined proximity to the MEMS microphone; and muting the MEMS microphone in response to detecting a ping (e.g., coming directionally from a floor monitor on a stage, in order to avoid feedback).

Additional and/or alternative functionalities and/or facilities that can be initiated, based at least in part on the gathered or collected data, in various example implementations, can also comprise determining distances (e.g., using time of flight [TOF] processes) from the MEMS microphone to one or more proximate surface for the purpose of precise/repeatable microphone placement (e.g., non-MEMS microphone and/or MEMS microphone placement); and time-alignment of a multi-microphone, multi-track audio recording by use of each respective microphone's identified, recorded and/or chronicled response to a broadcasted ultrasonic ping (e.g., a single ping, a repeated single ping, a sequence of disparate pings, and/or a repeated sequence of disparate pings). Concerning the time-alignment of the multi-microphone multi-track audio recording and the broadcasted ultrasonic pings, the broadcasted ultrasonic pings can be embedded, during the recording to the audio recording, into the multi-track audio recording for future reference and use, for instance, by a sound engineer identity and/or a post-processing audio process operational on a processor (e.g., processing circuit), to adjust the audio recording in some manner. The broadcasted ultrasonic pings can also be used in real-time to facilitate adjustment to one or more parameter associated with an array of equipment (e.g., sound equipment—microphone equipment, equalizer equipment, and other equipment typically employed, for example, in sound recording studios, music halls, concert venues, opera houses, auditoriums, movie theaters and complexes, and the like) used to record and/or broadcast the audio signal input via the MEMS microphone in conjunction with amplifier equipment.

Other actions, facilities, and/or functionalities that can result from use of the collected data can include object and/or source classification, wherein a return of an emitted ultrasonic signal in the ultrasonic range can be used to determine whether or not an inanimate object (e.g., microphone, other MEMS or non-MEMS equipment, microphone baffle, sound shield, sound equipment, and the like) or an animate object (e.g., objects capable of movement and/or generating audible sounds, such as humans, dogs, cats, . . . ) is positioned within a predetermined distance of an array of sound equipment. In regard to the determination of whether or not an object is animate or inanimate, a returned emitted ultrasonic ping signal can be used to both distinguish between whether an object is animate or inanimate, as well as determining the positioning of each and every object situated within the defined space.

In regard to inanimate objects, it should be observed for purposes of the subject disclosure, that groups of inanimate objects can be sources of both audible sound (e.g., musical instruments, automotive engine noises, vibrations generated by non-destructive testing apparatuses, and the like) and ultrasonic sound (e.g., frequencies generated by non-destructive testing apparatuses). It should also be noted in regard to the subject disclosure, that while the description is explained in terms of capturing audible frequencies and/or ultrasonic frequencies, the subject matter can have additional applicability in capturing and using frequencies below audible frequencies (e.g., frequencies below approximately 20 Hz—infrasound).

Concerning other MEMS equipment that can be used in collaboration with the subject disclosure, in some implementations, this equipment can comprise: MEMS motion detection sensor equipment, MEMS light detection, MEMS sensor equipment, MEMS pressure detection equipment, MEMS underfoot pressure pad equipment, and the like.

Other beneficial uses that can be made the collected data, in some embodiments, can include also include, based at least in part on the presence of other ultrasonic emitter equipment, ultrasonic broadcasting equipment, and/or ultrasonic transceiver equipment, adaptively and/or dynamically changing ultrasound frequencies at which the system can operate. In some embodiments, the collected data can also be used to adaptively and/or dynamically change the timings associated with ultrasonic transmissions. In some other embodiments, adaptively and/or dynamically changing the timing associated with ultrasonic transmissions can be performed to take advantage of frequency-domain masking of any audible artifacts that can be due to the ultrasonic transmissions themselves (e.g., impulse response that can be created by an 'edge' of a transmitted ultrasonic pulse).

In various additional and/or alternative implementations, the collected data can be used to adjust and/or modify gain values, adapt modes of use of the disclosed systems and their respective and associated components, and the like, based for instance on ultrasonic instructions or commands that can have been received from beacon equipment and/or other nearby microphone equipment.

In regard to the subject disclosure it should be observed that the detailed MEMS transducer equipment (e.g., MEMS microphone equipment) need not be the sole radiation source, as the MEMS transducer can also work in conjunction and/or collaboratively with other purpose built CMUT and PMUT equipment, and other ultrasonic transmitters, wherein the purpose built CMUTs and PMUTs can be co-located with the MEMS transducer equipment, or can be on the same die (e.g., within an array of MEMS transducer equipment, groups of elements could be dedicated to transmit only, other grouping of elements could be dedicated to receive only, etc.), in the same package, or externally located. External ultrasonic transmitting equipment could operate like 'beacons,' in that they would send command data, timing signal data, and/or other information/instruction data that can occur at defined or predetermined intervals.

With regard to FIG. 1 and in accordance with example implementations and/or embodiments, illustrated therein is a system 100 that can be representative of a MEMS transducer, such as a MEMS microphone device. As depicted system 100 can comprise a MEMS microphone equipment 102 that can receive audio-band capture data 110$b$ and/or ultrasonic transmit/receive data 110$a$. MEMS microphone equipment 102, as has been noted earlier, can be MEMS transducer equipment. In response to receiving audio-band capture data 110$b$ and and/or ultrasonic transmit/receive data 110$a$, MEMS microphone equipment 102 can forward the received audio-band capture data 110$b$ and and/or ultrasonic transmit/receive data 110$a$, via ultrasonic signal 104$a$ and audio-band signal 104$b$, to processing circuits 106. The processing circuits 106 can process the ultrasonic signal 104$a$ and/or audio-band signal 104$b$, wherein the processing circuits 106 can use the ultrasonic signal 104$a$ to, in real-time, adapt, modify, and/or adjust one or more parameter/characteristic associated with the audio-band signal 104$b$. Processing circuits 106 can thereafter output the processed audio-band signals, and any data (e.g., based for example on the ultrasonic signal 104$a$) that can be beneficial in post-production of the processed audio-band signals.

Processing circuits 106, based for instance on the ultrasonic signal 104$a$ and/or the audio-band signal 104$b$ can also generate one or more bias/ultrasonic drive parameter data that can be emitted by the MEMS microphone equipment 102 in the ultrasonic range. In various implementations, processing circuits 106 can operate in collaboration with ultrasonic drive equipment 108 to generate the one or more bias/ultrasonic drive parameters. The one or more generated bias/ultrasonic drive parameters can then be conveyed to the MEMS microphone equipment 102, which, acting as an ultrasonic loudspeaker operational in the ultrasonic wave frequency, can broadcast. In certain embodiments, the generated bias/ultrasonic drive parameters can be used by MEMS microphone equipment 102 to reconfigure itself in some manner. In certain other embodiments, the generated bias/ultrasonic drive parameters, on being broadcast by MEMS microphone equipment 102 can be used by other MEMS transducer devices to adapt themselves as a function of the generated bias/ultrasonic drive parameters.

Figure 2:
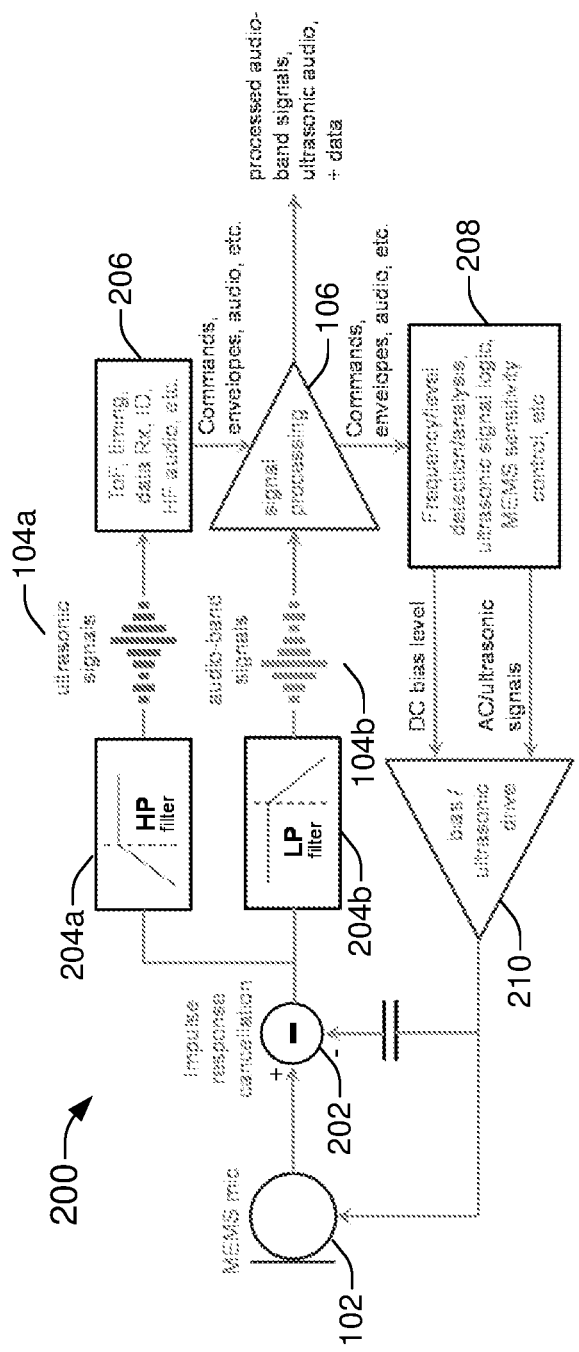
FIG. 2 is a high-level depiction of a system for using MEMS transducer ultrasonic response in accordance with various example implementations and/or embodiments set forth in this disclosure.

In accordance with example implementations FIG. 2 provides additional illustration of system 100 (now designated as system 200) that can be representative of a MEMS transducer, such as MEMS microphone equipment 102. System 200, can comprise MEMS microphone equipment 102 that in response to receiving a flow of ultrasonic transmit/receive signal 110$a$ and/or audio-band capture signal 110$b$, prior to forwarding the flow of input data (e.g., ultrasonic transmit/receive signal 110$a$ and/or audio-band capture signal 110$b$) to respective high pass filters 204$a$ and low pass filters 204$b$, can perform one or more impulse response cancellation operation 202 on the flow of input signal. Application of impulse response cancellation can be performed in order to ameliorate or cancel ultrasonic drive signals that would otherwise corrupt audio signal. In all the described embodiments, received signals from the MEMS transducer can be converted to digital form in the processing circuitry, at any point in the signal path. For example, signals received by the high/low pass filters can be an analog signal or a digital signal. In other embodiments, 106 and 206 and 208 can operate in analog or digital.

High pass filters 204$a$ and low pass filters 204$b$ can be applied to the stream of input signal in order to filter the flow of input signal based on frequency thresholds associated with each of the filters. For instance, high pass filters 204$a$ can filter or group frequencies associated with frequencies equal to or greater than a ultrasonic threshold value, while low pass filters 204b can group or filter frequencies associated with the collection of frequencies designated as being "audio-band frequencies" (e.g., frequencies within the domain of human hearing—between approximately 20 Hz and approximately 20 kHz). The use of the high pass filters 204a and the low pass filters 204b can separate the input signal flow into a first stream comprising ultrasonic signal 104a, wherein the first stream can comprise a signal that is equal to or exceeds the ultrasonic threshold value, and a second stream comprising audio-band signal 104b, wherein the second stream can comprise a signal that equals or exceeds a bottom threshold value (e.g., in the case of the subject disclosure—about 20 Hz) and/or approaches but typically does not exceed a top threshold value (e.g., for purposes of this disclosure—approaching 20 kHz).

The first stream of signals (e.g., ultrasonic signal 104a) can be forwarded to one or more first component/circuit 206 of processing circuit 106 for analysis and determination as to whether the first stream of signals comprises embedded TOF signal, timing data, data pertaining to ultrasonic transceiver equipment, high frequency audio signal, identification data associated with ultrasonic transceiver equipment, and similar embedded or includes pertinent data. In response to the one or more first component/circuit 206 determining that the first stream of signals includes, for example, embedded TOF signal, timing data, data pertaining to ultrasonic transceiver equipment, high frequency audio signal, and/or identification data associated with ultrasonic transceiver equipment, first component/circuit 206 can extract and classify the embedded and/or included data into various disparate categories, such as command data, high frequency audio signal, TOF signal, etc., that can be utilized by processing circuitry 106 to perform one or more future actions based at least in part on the extracted and classified categories.

Concerning the second stream of signals (e.g., audio-band signal) emerging from the low pass filter, this signal stream can be directed to processing circuitry 106, wherein the processing circuitry 106 can use the signals extracted and classified by first component/circuit 206 (e.g., the processed ultrasonic signal 104a) to in real-time adapt, modify, and/or adjust one or more parameter/characteristic associated with the audio-band signal 104b. Processing circuitry 106, after amending and processing the second stream of data, can thereafter output the processed audio-band signals, and any additional data (e.g., based, for example, on associated first stream) that can be beneficial in the post-production of the processed audio-band signals.

Thereafter, processing circuitry 106 can forward, to a second component/circuit 208, generated data comprising groups of command data, instruction data, parameter data, audio-band signals, ultrasonic signals, and the like. The second component/circuit 208, based on the aforementioned generated data can perform one or more of frequency analyses and/or level detection analyses, MEMS sensitivity control, ultrasonic signal logic, and the like to generate DC bias level values and/or AC/ultrasonic signals. The DC bias level values and/or the AC/ultrasonic signals can be supplied to ultrasonic drive equipment 210 that can provide feedback signal data for use by the one or more impulse response cancellation operation 202. Contemporaneously with supplying feedback signal data to the one or more impulse response cancellation operation 202, the second component/circuit 208, using various facilities/functionalities associated with the MEMS microphone 102 can both broadcast or project the AC/ultrasonic signals into the ambient environment as well as listening for a return of the ultrasonic signals (albeit attenuated) from objects and/or surfaces located in the ambient environment. As has been noted earlier, the emission of ultrasonic signals and the return of attenuated ultrasonic signals can be used in TOF processes to adjudge distances to various objects and/or surface situated in the ambient environment.

Figure 3:
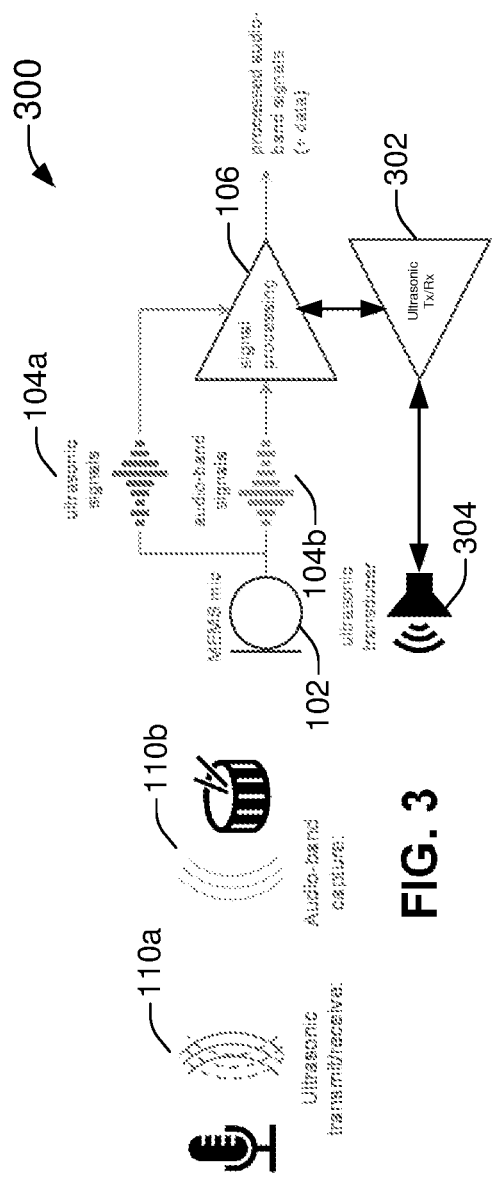
FIG. 3 provides another high-level depiction of a system for using MEMS transducer ultrasonic response in accordance with various example implementations and/or embodiments set forth in this disclosure.

FIG. 3 illustrates variation of system 100 (now designated as system 300). System 300 can comprise MEMS transducer equipment (e.g., MEMS microphone equipment 102) that in response to receiving ultrasonic transmit/receive signal 110a and/or audio-band capture signal 110b can forward the received ultrasonic transmit/receive signal 110a and/or audio-band capture signal 110b, via ultrasonic signal 104a and audio-band signal 104b, to processing circuits 106. Processing circuits 106, in response to receiving the ultrasonic signal 104a and audio-band signal 104b can use the ultrasonic signal 104a, in real-time to, adapt, modify, and/or adjust one or more parameter/characteristic associated with the audio-band signal 104b. As the functionalities and/or facilities associated with processing circuits 106 and ultrasonic drive equipment 108 have been outlined in relation to FIG. 1, for the sake of brevity of exposition, additional elucidation of these aspects have been omitted.

As can be observed in review of FIG. 3, the one or more bias/ultrasonic drive parameters generated by processing circuits 106 and/or ultrasonic transmit/receive (Tx/Rx) equipment 302 (e.g., has similar functionalities to those described in the context of ultrasonic drive equipment 108) can be directed to an ultrasonic transducer 304 that can use the bias/ultrasonic drive parameters to broadcast and receive streams of ultrasonic transmission data. These steams of ultrasonic transmission data can comprise configuration parameter data that can be used by equipment capable of receiving streams of broadcasted ultrasonic transmission data to reconfigure or adapt themselves in accordance with the transmitted configuration parameter data. In some implementations, MEMS microphone equipment 102 can beneficially use the broadcast ultrasonic transmission data to perform actions, such as change states from a first state (e.g., an operative state) to a second state (e.g., sleep state), in response to data included in the ultrasonic transmission data, from a second state to a first state, and/or, based on the ultrasonic transmission data broadcast from the ultrasonic transducer 304, from a first state and/or a second state to a third state (e.g., a low power state). Ultrasonic transmit/receive equipment 302 and ultrasonic transducer 304 can operate bidirectionally such that ultrasonic transmit/receive equipment 302 can process received signals from ultrasonic transducer 304 to determine TOF data and generate commands to other devices. In other embodiments, ultrasonic transmit/receive equipment 302 can generate wake up signals to processing circuit 106 to wake up MEMS microphone equipment 102.

Figure 4:
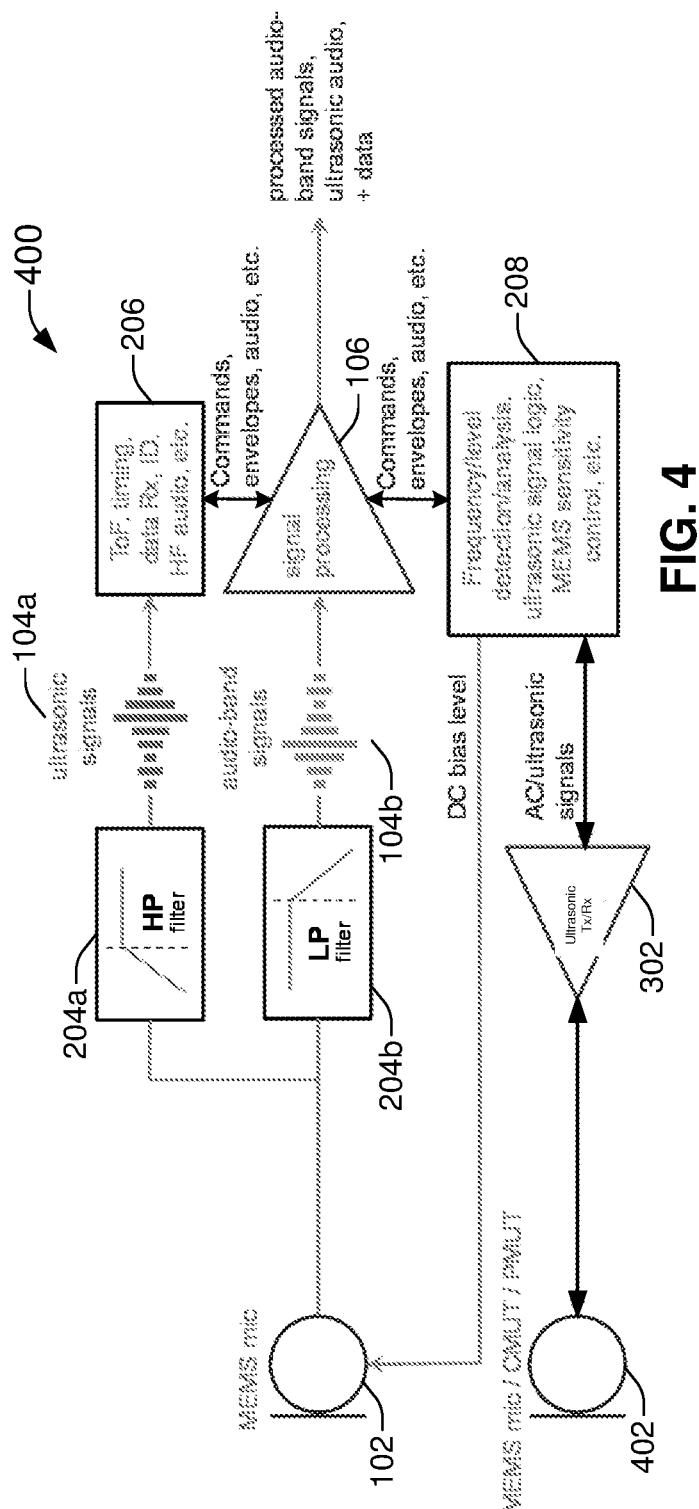
FIG. 4 is a further high-level depiction of a system for using MEMS transducer ultrasonic response in accordance with various example implementations and/or embodiments set forth in this disclosure.

In reference to FIG. 4 that provides additional illustration of system 100 (now labeled as system 400) that can comprise a MEMS transducer, such as MEMS microphone equipment 102. System 400 can operate in a manner that is similar to that described in relation to system 200, depicted in FIG. 2 and system 300 illustrated in FIG. 3. In relation to FIG. 4, system 400 can comprise MEMS microphone equipment 102, that as described in relation to FIG. 2 and system 200, that in response to receiving, as input data, a flow or stream of ultrasonic transmit/receive data 110a and/or audio-band capture data 110b, can direct the flow or steam of input data (e.g., ultrasonic transmit/receive data 110a and/or audio-band capture data 110b) to respective band filters (e.g., high band pass filters 204a and/or low band pass filters 204b). As noted above, the respective band filters can filter or group frequencies according to whether or not the incoming data falls below, and/or above, certain defined threshold values. For instance, the high band pass filters 204a can be used to filter out frequencies above a first threshold value (e.g., frequencies approaching and above, for instance, approximately 20 kHz), whereas low band pass filters 204b can used to filter out frequencies between a second threshold value and a third threshold value, wherein, in some embodiments, application of the second threshold value filters out frequencies below and/or about 20 Hz, and application of the third threshold value can filter out frequencies approaching, but not exceeding, for example, 20 kHz. The output the respective high band pass filters 204a and the low band pass filters 204b can comprise a first signal stream and a second signal stream, the first signal stream emerging from the high band pass filters 204a can be conveyed to one or more first component/circuit associated with processing circuit 106; the second signal stream emanating from low band pass filters 204b can be directed to processing circuit 106. Since the processing, data manipulations, facilities, and/or functionalities associated with processing circuit 106 and its affiliated first component/circuit 206 and second component/circuit 208, based on the first signal stream and/or the second signal stream, are similar to those detailed in regard to FIG. 2, for purposes of brevity of exposition, the details associated with these aspects have been omitted in regard to FIG. 4.

Thus, in regard to FIG. 4, the second component/circuit 208 can generate, as output, DC bias level values and/or AC/ultrasonic signals, and communicate signals/data/commands bidirectionally with processing circuit 106 and ultrasonic transmit/receive (Tx/Rx) equipment 302 (e.g., as illustrated in FIG. 3). The DC bias level values can be fed into the MEMS microphone equipment 102; the DC bias level values can be employed as feedback to the MEMS microphone equipment 102, so that the MEMS microphone equipment 102 can adapt one or more MEMS microphone equipment operational parameter in real-time. The AC/ultrasonic signals that are output or sent by second component/circuit 208 can be sent or received by ultrasonic transmit/receive (Tx/Rx) equipment 302 that can facilitate one or more of alternative and disparate MEMS microphone equipment (e.g., other than MEMS microphone equipment 102) and/or a variety of other MEMS transducer equipment, as well as piezoelectric micro-machined ultrasonic transducers (PMUTs) and/or capacitative micro-machine ultrasonic transducers (CMUTs)) to broadcast and/or project the AC/ultrasonic signals (and any embedded instruction data, parameter data, unique identification data associated with one or more of the MEMS transducer equipment, PMUTs and CMUTs, configuration data, update data to specified MEMS transducer equipment, PMUTs and/or CMUTs) in one or more ultrasonic frequency.

Figure 5:
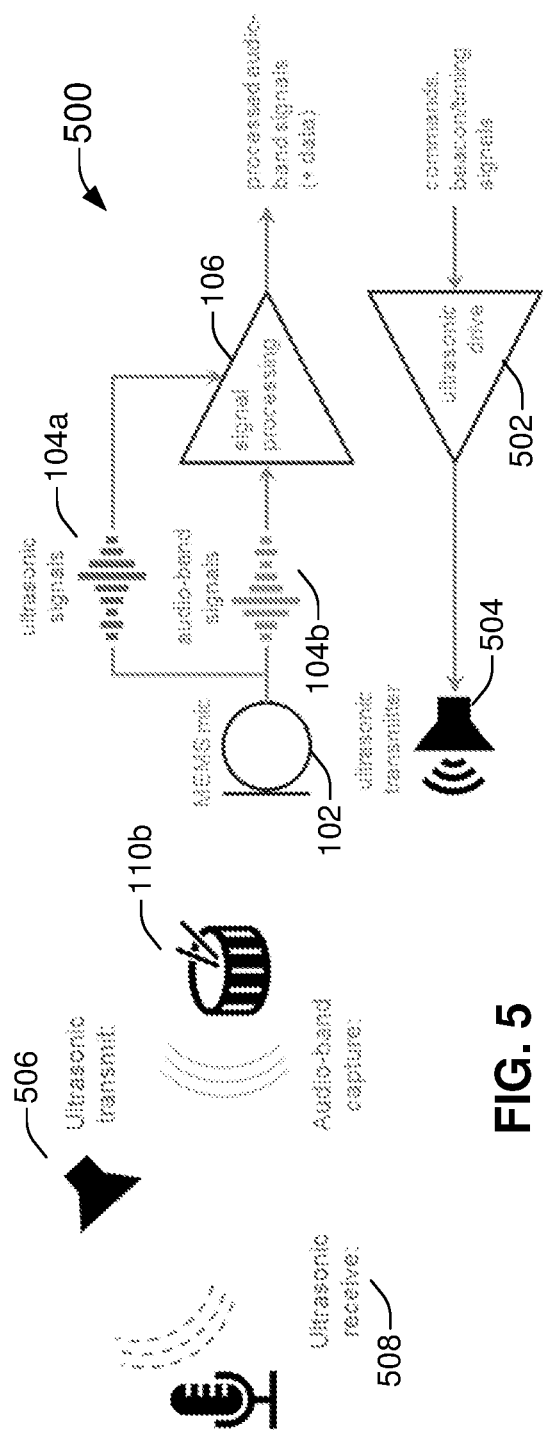
FIG. 5 provides yet another high-level depiction of a system for using MEMS transducer ultrasonic response in accordance with various example implementations and/or embodiments set forth in this disclosure.

Turning now to FIG. 5 that illustrates an additional variant embodiment of system 100 (now represented as system 500) depicted in FIG. 1. System 500 can have a shared functional similarity with system 100, as illustrated in FIG. 1, in that as outlined with regard to system 100, the MEMS transducer equipment 102, the forwarding of the ultrasonic transmit data (now emanating, and/or emitted, from one or more of ultrasonic transmitter equipment 504 and ultrasonic transmitter equipment 506) and the audio-band capture data 110b can be directed, via ultrasonic signal 104a and audio-band signal 104b, to processing circuit 106. The distinction with the variant embodiment presented in FIG. 5 is that system 500 can have an external separate individuated ultrasonic transmitter 504 that can be coupled to distinct ultrasonic drive equipment 502.

In regard to ultrasonic drive equipment 502, this equipment can operate in a manner similar to that described in the context of ultrasonic drive equipment 108. Nevertheless, because ultrasonic drive equipment 502 and ultrasonic transmitter equipment 504 can be associated with one another, the source input to ultrasonic drive equipment 502 can be distinct from that detailed in regard to ultrasonic drive equipment 108. Similarly, concerning the ultrasonic transmitter equipment 506, the driving input for this equipment, in various implementations, can be ultrasonic drive equipment 502, ultrasonic drive equipment 108, and/or peripheral ultrasonic drive equipment that is external, separate, independent, and/or distinct from both ultrasonic drive equipment 108 and/or ultrasonic drive equipment 502.

Figure 6:
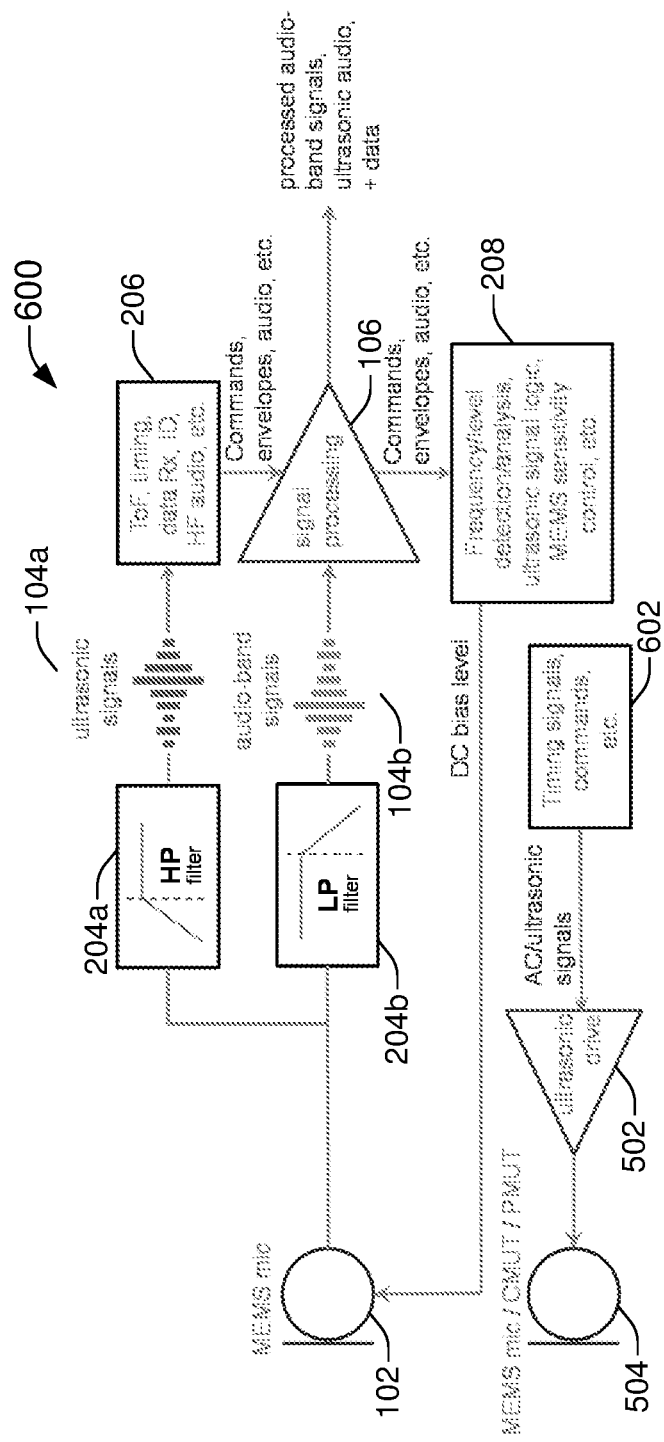
FIG. 6 illustrates another system for using MEMS transducer ultrasonic response in accordance with various example implementations and/or embodiments set forth in this disclosure.

FIG. 6 illustrates a further variant embodiment of system 100 (now represented as system 600) depicted in FIG. 1 and FIG. 5. System 600 can have functional similarities with systems 200 and 500, as illustrated in FIG. 2 and FIG. 5, in that as outlined with regard to systems 200 and 500 the MEMS transducer equipment 102, the forwarding of the ultrasonic transmit data (now emanating, and/or emitted, from one or more of ultrasonic transmitter equipment 504 and ultrasonic transmitter equipment 506) and the audio-band capture data 110b can be directed, via ultrasonic signal 104a and audio-band signal 104b having respectively been processed by high band pass filters 204a and/or low band pass filters 204b, to processing circuit 106. As was noted in relation to the facilities and/or functionalities associated with first component/circuit 206 of processing circuit 106 and second component 208 of processing circuit 106, these aspects can be similar to those described in relation to FIG. 2 and FIG. 4.

Concerning the distinctions between the descriptions provided in connection to FIG. 2, FIG. 4, and FIG. 5 in relation to FIG. 6, is that there can be one or more external ultrasonic emitter (e.g., an external separate individuated ultrasonic transmitter 504 that can be coupled to distinct ultrasonic drive equipment 502, as well as an external ultrasonic broadcaster 506). Accordingly, because ultrasonic drive equipment 502 and ultrasonic transmitter equipment 504 can be associated with one another, the source input 602 to ultrasonic drive equipment 502 can be distinct from that detailed in regard to ultrasonic drive equipment 108. Similarly, concerning the ultrasonic transmitter equipment 506, the driving input for this equipment can, in various implementations, be ultrasonic drive equipment 502, ultrasonic drive equipment 108, and/or peripheral ultrasonic drive equipment that can be separate, independent, and/or distinct from both ultrasonic drive equipment 108 and/or ultrasonic drive equipment 502.

Figure 7:
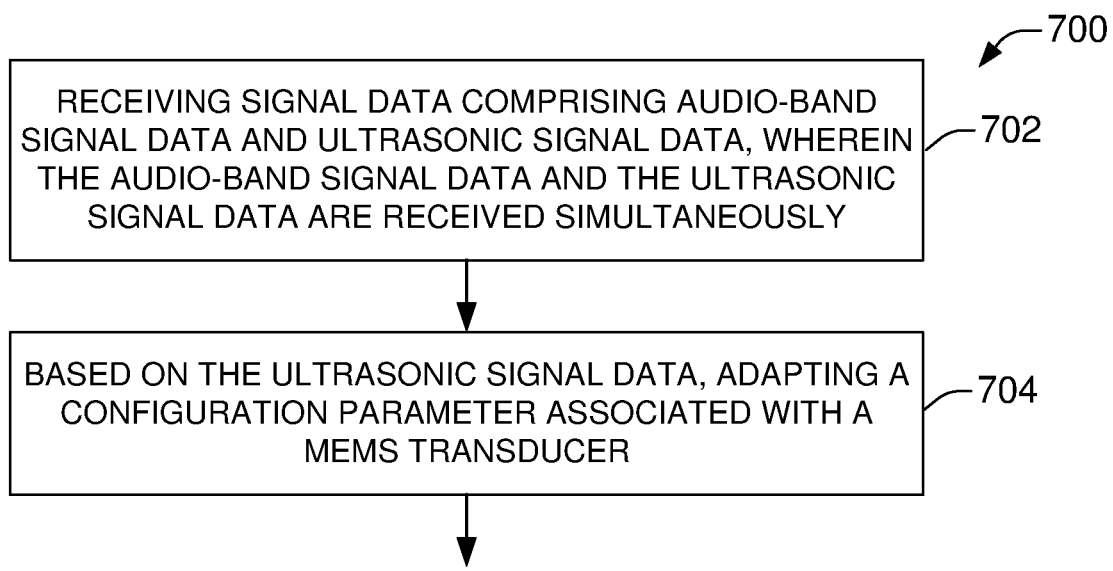
FIG. 7 is a flow diagram or method for using MEMS transducer ultrasonic response in accordance with various example implementations and/or embodiments set forth in this disclosure.

FIG. 7 depicts an example method implantation 700 for using MEMS transducer ultrasonic response in accordance with various example implementations and/or embodiments. Method 700 can begin at act 702 where a processor circuit of a MEMS transducer system can receive signal data comprising audio-band signal and ultrasonic signal. The audio-band signal and the ultrasonic signal can be received simultaneously. At act 704, the MEMS transducer system, based on the ultrasonic signal can adapt a configuration parameter associated with MEMS transducer equipment associated with the MEMS transducer system.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the words "example" and/or "exemplary" are used herein to mean serving as an example, instance, or illustration. Any aspect or design described herein as "example" and/or "exemplary" is not necessarily to be construed as preferred or advantageous over other aspects or designs. Rather, use of the word exemplary is intended to present concepts in a concrete fashion.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above-described components, devices, systems and the like, the terms (including reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems have been described with respect to interaction between several components. It can be appreciated that such systems and/or components can include those components or specified subcomponents, some of the specified components or subcomponents, and/or additional components, and according to various permutations and combinations of the foregoing. Subcomponents can also be implemented as components communicatively coupled to other components rather than included within parent components (hierarchical). Additionally, it should be noted that one or more components may be combined into a single component providing aggregate functionality or divided into several separate subcomponents, and any one or more middle layers, may be provided to communicatively couple to such subcomponents in order to provide integrated functionality. Any component described herein may also interact with one or more other components not specifically described herein.

In addition, while a particular feature of the subject disclosure may have been disclosed with respect to only one of the several implementations, such feature may be combined with one or more other features of the other implementations as may be desired and advantageous for any given or particular application. Furthermore, to the extent that the terms "includes," "including," "has," "contains," or variants thereof, and other similar words are used in either the detailed description or the claims, these terms are intended to be inclusive in a manner similar to the term "comprising" as an open transition word without precluding any additional or other elements.

What is claimed is:

1. A system, comprising:
a microelectromechanical system (MEMS) microphone device configured to capture an integrated signal representing an ultrasonic signal and an audio-band signal simultaneously; and
a processing circuitry configured to adjust a configuration parameter associated with the MEMS microphone device based on the ultrasonic signal, wherein the ultrasonic signal is extracted, by the processing circuitry, from the integrated signal based on a determined frequency value of a band filter.

2. The system of claim 1, wherein the ultrasonic signal is a first ultrasonic signal, and wherein the MEMS microphone device receives the first ultrasonic signal in response to sending a second ultrasonic signal.

3. The system of claim 1, wherein the MEMS microphone device is a first MEMS microphone device, wherein the ultrasonic signal is a first ultrasonic signal, and wherein a second MEMS microphone device configured to send the first ultrasonic signal and the first MEMS microphone device is configured to receive the first ultrasonic signal.

4. The system of claim 1, wherein the configuration parameter is stored in a memory associated with the processing circuitry, and wherein the configuration parameter is determined dynamically.

5. The system of claim 1, wherein the ultrasonic signal comprises the configuration parameter.

6. The system of claim 1, wherein the processing circuitry is further configured to transmit instruction data in an ultrasonic frequency or the audio-band signal.

7. The system of claim 1, wherein the MEMS microphone device is a first MEMS microphone device, and wherein the ultrasonic signal is broadcast by a second MEMS microphone device.

8. The system of claim 1, wherein the MEMS microphone device is a first MEMS microphone device, and wherein the ultrasonic signal is received from a second MEMS microphone device.

9. The system of claim 1, wherein the ultrasonic signal is a first ultrasonic signal, and wherein the MEMS microphone device, in response to the first ultrasonic signal, broadcasts a second ultrasonic signal.

10. The system of claim 1, wherein the MEMS microphone device is a first MEMS microphone device, wherein the ultrasonic signal is broadcast by a MEMS transducer device as an ultrasonic ping, and wherein the MEMS transducer device comprises a grouping representative of capacitative micro-machined ultrasonic transducer equipment, piezoelectric micro-machined ultrasonic transducer equipment, or the first MEMS microphone device.

11. The system of claim 1, wherein the MEMS microphone device is configured to operate as loudspeaker equipment by radiating the signal at a frequency greater than a resonant frequency of the MEMS microphone device.

12. The system of claim 1, wherein the ultrasonic signal comprises a signal for the processing circuit to determine a distance to an object proximately located to the MEMS microphone device.

13. The system of claim 1, wherein the MEMS microphone device is a first MEMS microphone device, and wherein the ultrasonic signal represents a signal for the first MEMS microphone device to determine a distance from the first MEMS microphone device to a second MEMS microphone device.

14. The system of claim 1, wherein the MEMS microphone device is a first MEMS microphone device, and wherein the ultrasonic signal represents a directive for the first MEMS microphone device to listen for an ultrasonic ping radiated by a second MEMS microphone device.

15. A method, comprising:
  receiving, by a processing circuit, integrated signal data comprising audio-band signal data and ultrasonic signal data, wherein the audio-band data and the ultrasonic signal data are received simultaneously; and
  based on the ultrasonic signal data, adapting, by the processing circuit, a configuration parameter associated with a microelectromechanical system (MEMS) transducer, wherein the ultrasonic signal data is extracted from the integrated signal data based on a threshold value.

16. The method of claim 15, wherein the MEMS transducer represents a microphone, further comprising in response to detecting, by the processing circuit, an object within a defined distance to the microphone, switching the microphone from a first state to a second state, wherein the first state represents a active state and the second state represents a inactive state.

17. The method of claim 15, further comprising, based on the configuration parameter, changing a gain value associated with the MEMS transducer from a first gain value to a second gain value.

18. The method of claim 15, wherein the MEMS transducer represents a microphone, further comprising, based on the ultrasonic signal data and a determination that a distance between user identities located proximate to the microphone has exceeded a threshold distance, adjusting, by the processing circuit, an equalization value of the microphone to compensate for a change in the distance.

19. The method of claim 15, further comprising listening, by the processing circuit, for a group of ultrasonic aggressor signals emitted by ultrasonic aggressor equipment, and based on the group of ultrasonic aggressor signals, determining a collection of ultrasonic frequencies associated with the group of ultrasonic aggressor signals and identifying the collection of ultrasonic frequencies as being occupied.

20. The method of claim 15, wherein the ultrasonic signal data comprises a sequence of repeating ultrasonic ping tones.

* * * * *